US009954768B2

(12) United States Patent
Allen et al.

(10) Patent No.: US 9,954,768 B2
(45) Date of Patent: *Apr. 24, 2018

(54) RECONNECTION OF A CLIENT TO A SERVER IN A TRANSACTION PROCESSING SERVER CLUSTER

(71) Applicant: INTERNATIONAL BUSINESS MACHINES CORPORATION, Armonk, NY (US)

(72) Inventors: Gerald M. Allen, Hursley (GB); Michael D. Brooks, Hursley (GB); Jenny J. He, Hursley (GB); Brad Roeger, Hursley (GB); Philip I. Wakelin, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/884,020

(22) Filed: Oct. 15, 2015

(65) Prior Publication Data

US 2016/0112304 A1 Apr. 21, 2016

(30) Foreign Application Priority Data

Oct. 17, 2014 (GB) .................................. 1418447.7

(51) Int. Cl.
*H04L 12/707* (2013.01)
*H04L 12/703* (2013.01)

(52) U.S. Cl.
CPC .............. *H04L 45/22* (2013.01); *H04L 45/28* (2013.01)

(58) Field of Classification Search
CPC ........ H04L 12/707; H04L 45/22; H04L 45/28
See application file for complete search history.

(56) References Cited

U.S. PATENT DOCUMENTS 6,031,978 A * 2/2000 Cotner .............. G06F 17/30575
707/E17.032
6,058,424 A 5/2000 Dixon et al.
(Continued)

FOREIGN PATENT DOCUMENTS

GB 2531341 B 12/2016
WO WO2013036698 A3 3/2013

OTHER PUBLICATIONS

Allen et al., "Reconnection of a Client to a Server in a Transaction Processing Server Cluster," Amendment, Application No. GB1418447.7, Dated Aug. 8, 2016, 14 pages.
(Continued)

*Primary Examiner* — Charles C Jiang
*Assistant Examiner* — Kyaw Z Soe
(74) *Attorney, Agent, or Firm* — Leonard T. Guzman (57) ABSTRACT

Reconnection of a client to a server in a transaction processing server cluster having a single address. A connection is established with a first server in the server cluster and units of work are requested at the first server. A failure of the connection to the first server is detected. A connection is established with a second server in the server cluster and units of work at the second server are requested. A reconnection request is received from the first server, in which the first server has unresolved units of work. The connection with the second server is terminated, including completing current units of work. The client is reconnected with the first server and the unresolved units of work with the first server are resynchronized.

7 Claims, 7 Drawing Sheets

(56) References Cited

U.S. PATENT DOCUMENTS

| | | |
|---|---|---|
| 6,199,110 B1 | 3/2001 | Rizvi et al. |
| 6,292,905 B1 | 9/2001 | Wallach et al. |
| 6,381,617 B1 | 4/2002 | Frolund et al. |
| 6,490,610 B1* | 12/2002 | Rizvi ................ G06F 11/2028 707/999.01 |
| 6,609,213 B1 | 8/2003 | Nguyen et al. |
| 7,076,691 B1 | 7/2006 | Dobberpuhl et al. |
| 7,539,746 B2 | 5/2009 | Bankier et al. |
| 7,694,178 B2 | 4/2010 | Hobson |
| 2003/0163755 A1 | 8/2003 | Fung et al. |
| 2006/0036617 A1* | 2/2006 | Bastawala .......... G06F 17/30595 |
| 2006/0271814 A1* | 11/2006 | Fung .................... G06F 11/203 714/4.11 |
| 2008/0162593 A1 | 7/2008 | Fung et al. |
| 2008/0172679 A1 | 7/2008 | Shen et al. |
| 2013/0007518 A1* | 1/2013 | George .................. H04L 67/06 714/16 |
| 2013/0066941 A1 | 3/2013 | Kruse et al. |
| 2013/0067095 A1* | 3/2013 | Kruse ................ H04L 67/1097 709/227 |
| 2014/0032964 A1* | 1/2014 | Neerincx .......... G06F 17/30348 714/18 |
| 2015/0301910 A1* | 10/2015 | Sathyanarayana .. G06F 11/1658 714/4.11 |

OTHER PUBLICATIONS

Intellectual Property Office, "Notification of Grant," Patent Serial No. GB2531341, Patents Act 1977: Patents Rules 2007, Dated Sep. 13, 2016, 2 pages.

Allen et al., "Reconnection of a Client to a Server in a Transaction Processing Server Cluster," U.S. Appl. No. 15/424,254, filed Feb. 3, 2017.

List of IBM Patents or Patent Applications Treated as Related, Dated Feb. 2, 2017, 2 pages.

"Recovering From a Server Failure," http://docs.oracle.com/cd/E11035_01/wls100/jms/recover.html, downloaded from internet Oct. 8, 2015, pp. 1-10.

Search Report for GB1418447.7 dated Apr. 17, 2015, pp. 1-3.

* cited by examiner

RECONNECTION OF A CLIENT TO A SERVER IN A TRANSACTION PROCESSING SERVER CLUSTER

PRIOR FOREIGN APPLICATION

This application claims priority from United Kingdom (GB) patent application number 1418447.7, filed Oct. 17, 2014, which is hereby incorporated herein by reference in its entirety.

BACKGROUND

One or more aspects of the present invention relate to the field of transaction processing server clusters. In particular, one or more aspects relate to reconnection of a client to a transaction processing server in a high availability server cluster.

A client transaction processing (TP) system that connects to a high availability (HA) cluster of cloned TP server systems can only connect to one of the server clones at any point in time, if the cloned servers are all identified using the same TP identifier. This causes a problem if one of the servers in the HA cluster needs to reconnect (perhaps after failure) to the client system in order to resolve partially completed transactions, such as in doubt units-of-work.

A first known solution is to manually stop the connection in the active server, before re-starting the connection in the idle server. This has the drawback that it requires manual intervention and can not easily be triggered on restart of a failed server without using an additional automation system.

A second known solution is to allow the connection to proceed, so that there are two connections from the client (one to each cloned server). This requires redesign of the TP to TP connection protocols which are based on a single stateful connection between predefined endpoints.

A third solution uses a third party management point which can be used to monitor the state of systems and notify HA cluster clients when servers in the HA cluster are available. This is a complicated and expensive solution.

SUMMARY

Shortcomings of the prior art are overcome and additional advantages are provided through the provision of a method of reconnecting a client to a server in a transaction processing server cluster having a single address. The method includes establishing a connection with a first server in a server cluster and requesting units of work at the first server; detecting a failure of the connection with the first server; establishing a connection with a second server in the server cluster and requesting units of work at the second server; receiving a reconnection request from the first server, wherein the first server has unresolved units of work; terminating the connection with the second server including completing current units of work; and reconnecting with the first server and resynchronizing the unresolved units of work with the first server.

Computer systems and computer program products relating to one or more aspects are also described and may be claimed herein.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure aspects of the present invention.

A client transaction processing (TP) system may include a client computing device connected via a network with a server cluster including multiple servers. The client computing device includes a TP program and communicates via the network with a server TP program which performs a transaction using one or more of the multiple servers which carry out units-of-work. A server cluster may have a single TP identifier and may include cloned servers to provide a high availability (HA) system.

A typical usage scenario when connecting transaction processing (TP) programs to other TP programs is that connections between partners are to be pre-defined with the network endpoint and have a unique TP identifier. This allows the security and connection properties to be tightly controlled, and is a prerequisite to the ability for TP requests to be routed between different TP servers in a cluster across multiple types of network hops. However, this causes a problem when there is not a one-to-one relationship between the network end point and the TP identifier, as is the case when a cluster of TP servers is listening on a shared TCP/IP end point.

A method and system are provided to allow a server in a cluster of a TP system to reconnect to a client in the TP system that is already in session with another server in the cluster, wherein the servers in the cluster are identified by the same TP identifier. A server in a cluster of cloned server systems is able to request to reconnect to a client that is already in session with another server in the cluster of cloned server systems. The server may make the reconnection request in order to resolve partially completed transactions, such as in doubt units-of-work. The server is able to request a cluster reconnect with the client during the connection establishment process, such that an existing connection can be cleanly terminated, and work switched to the restarting server.

A scenario is considered and illustrated in FIGS. 1A to 1D in which a TP system 100 includes a client-A 110 and a server cluster 120 including multiple servers, server-A 121, server-B 122. The server cluster 120 has a single TP identifier and a connection balancing mechanism 123 for directing a connection request to an available server 121, 122 within the server cluster 120.

Figure 1A:
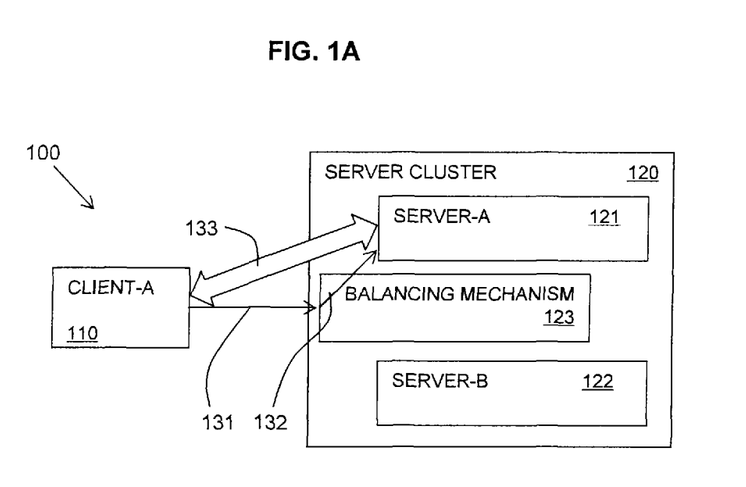
FIGS. 1A to 1D are schematic diagrams showing a sequence of events in a system in accordance with an aspect of the present invention.

Referring to FIG. 1A, a connection request 131 is sent from client-A 110 to the server cluster 120 and connection 132 is directed by the connection balancing mechanism 123 to server-A 121 resulting in a network connection 133. Client-A 110 sends transaction processing requests to the server cluster 120 and these are attached in server-A 121.

Figure 1B:
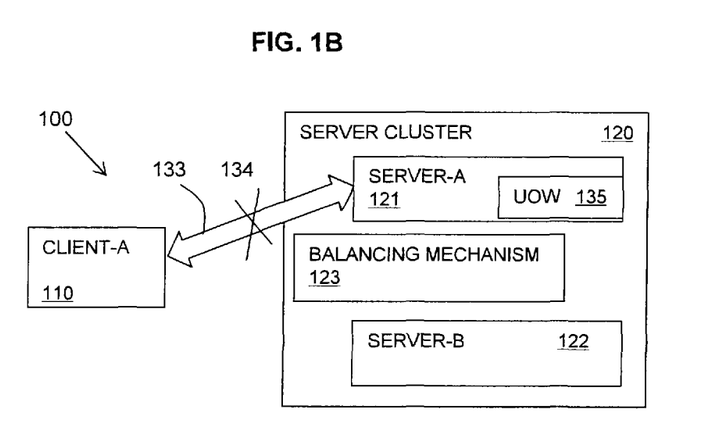

FIG. 1B shows that the network connection 133 from client-A 110 to server-A 121 is then broken 134 due to an unexpected termination of the network connection or server, leading to unresolved units-of-work (UOW) 135 remaining in server-A 121.

Figure 1C:
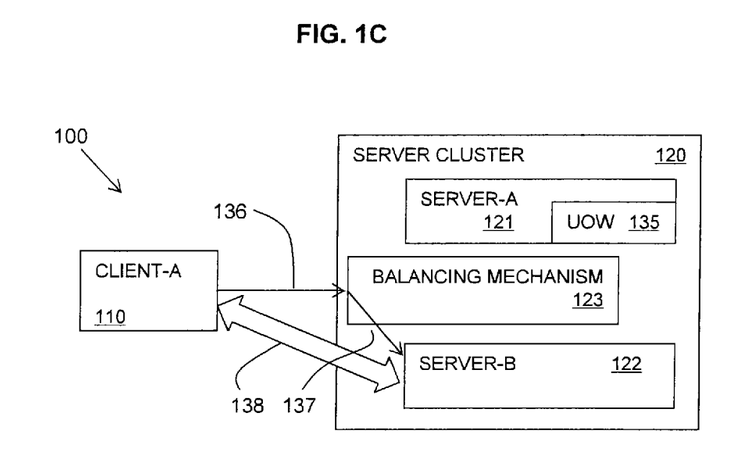

FIG. 1C shows that client-A 110 detects a network failure and reestablishes 136 a connection with server cluster 120 via a connection balancer, and a connection is established 137 with server-B 122 with network connection 138.

This results in server-A 121 being unable to reconnect to client-A 110, as there can only be one connection between the client 110 and any cluster server 120. Therefore server-A 121 is unable to resolve its unresolved units-of-work 135, and the recoverable resource locks associated with those transactions remain locked until server-B 122 is able to close its connection allowing server-A 121 to reconnect. This is despite the fact that either server-A 121 or server-B 122 are equally capable of processing work from the client-A 110.

Figure 1D:
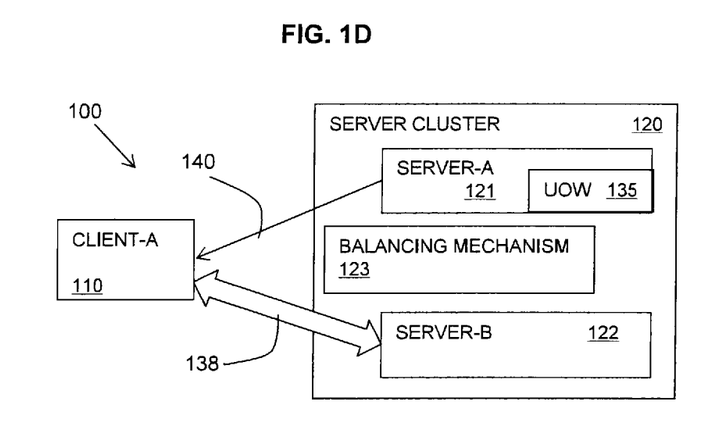

A solution proposed to this situation is shown in FIG. 1D where server-A 121 requests 140 a cluster reconnect with client-A 110 during the connection establishment process, such that an existing connection 138 (such as that with server-B 122) can be cleanly terminated, and work switched to the restarting server-A 121.

Server-A 121 notifies client-A 110 that it is available, allowing client-A 110 to determine when it reconnects back to server-A 121, and thus, minimizes any disruption. Server-A 121 sets a unique token (termed the cluster reconnect flag) in the connection establishment flow to signify it has units-of-work that are to be resynchronized, and should therefore be allowed to take over any existing connections with client-A 110.

The process of switching a client-server connection from one HA cluster member to another can also be optimized by the client using its knowledge of any outstanding units-of-work in either the server or the client, and also its knowledge of the requests flowing across a connection at any one point in time. No additional management components are required to manage the state of the servers.

Figure 2:
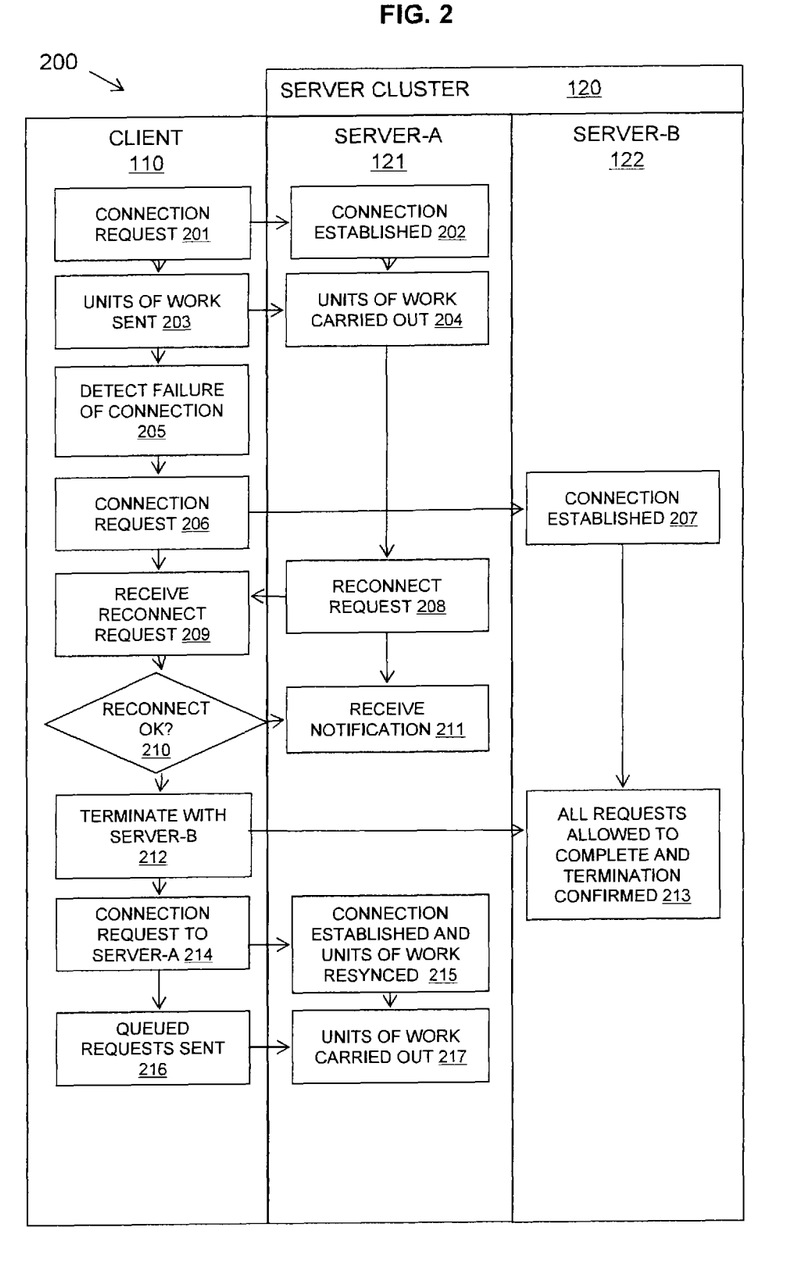
FIG. 2 is a swim-lane flow diagram of an embodiment of a method in accordance with an aspect of the present invention.

Referring to FIG. 2, a swim-lane flow diagram 200 shows one example of the described method as carried out between a client 110 and a server cluster 120 having a single TP identifier and including two servers, server-A 121 and server-B 122.

A connection request 201 is sent from the client 110 to the server cluster 120 and a connection is established 202 with server-A 121 which carries out 204 units-of-work as provided 203 by the client 110.

The client 110 detects 205 a failure in the established connection leaving unresolved units-of-work 204 at server-A 121.

The client 110 reestablishes 206 a connection with the server cluster 120 and a connection is established 207 with server-B 122.

Server-A 121 sends a reconnect request 208 to the client 110 specifying a cluster reconnect flag. The cluster reconnect flag is used to indicate that this is a reconnection for a previously established connection from client to server. It also indicates that it is for a server in a specific (named) cluster, so that the client is free to switch an active client-server connection from another server in the cluster to this server. The cluster reconnect flag avoids a client rejecting a reconnection request if the client is already connected to a server.

The client 110 receives 209 the reconnect request and determines 210 using its local configuration rules if a reconnect process is acceptable to the transaction processing if it is performed at this time. If the client 110 is not in session with another server, the request will be accepted. If the client 110 is in session with a server in the same cluster as the server making the reconnection request, then the reconnection request will be acceptable. However, if the reconnection request is from a server in a different cluster to a server the client is now in session with, the reconnection request will not be acceptable. If it is not acceptable, server-A 121 is notified of this 211.

If the reconnect process is acceptable, a normal termination 212 is started with server-B 122, with all requests being allowed to complete successfully, new requests may be queued if a queue is provided, and the termination is confirmed 213.

A connection request processing 214 is carried out for the reconnect to server-A 121, with no change in state of the connection. The final state of the connection with the server cluster will be unchanged, however, there will be transitionary state changes as the exiting server connection will be closed and the new server connection opened.

The outstanding units-of-work of server-A 121 are resynchronized 215 with the resource manager of the client 110 and any queued requests to the server cluster 120 are sent 216 over the new connection to server-A 121 and carried out 217 at server-A 121.

If the client 110 rejects the cluster reconnect request, as determined by its local configuration rules, then server-A 121 may resubmit its connection request at a later time which could be acceptable to the client 110.

The result of this is that server-A 121 is able to resolve its unfinished transactions and resolve the locks associated with those transactions very shortly after it becomes unavailable and with only a small interruption to the flow of work between the client and the HA server cluster. The server is able to notify the client when it is available allowing the client to determine when it reconnects back to any HA cluster server, and thus minimizing any disruption.

In addition, the client system is able to control when the reconnect sequence happens, and can use local configuration rules, and knowledge of connection usage to optimize the timing of the reconnect process so as to have minimal affect on the flow of work between the client and HA server cluster.

The process of switching a client-server connection from one HA cluster member to another can also be optimized by the client using its knowledge of any outstanding units-of-work in either the server or the client, and also its knowledge of the requests flowing across a connection at any one point in time.

Additionally, there are no third party management components required to support this flow simplifying the implementation of the method.

Figure 3:
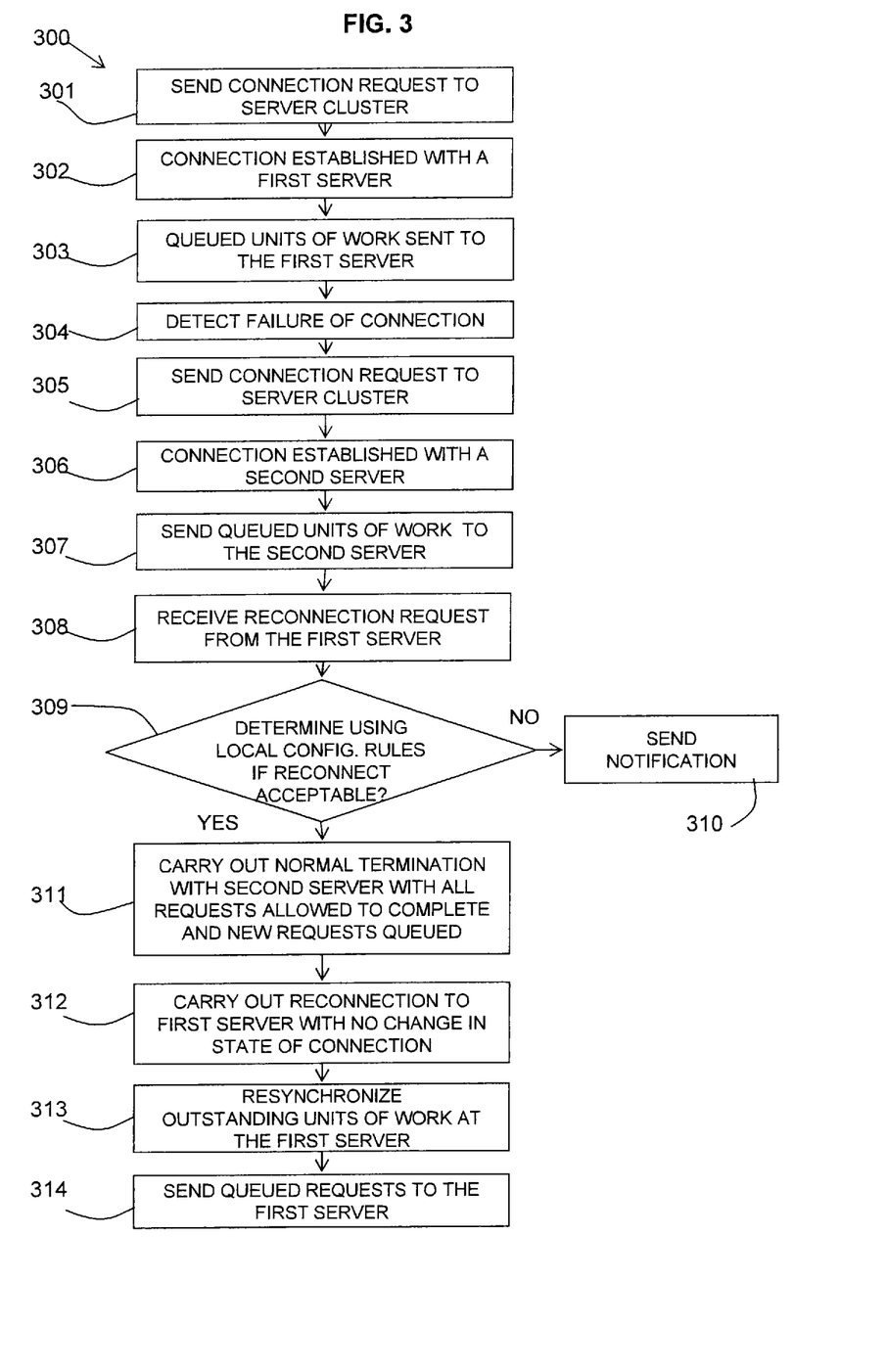
FIG. 3 is a flow diagram of an embodiment of a method at a client in accordance with an aspect of the present invention.

Referring to FIG. 3, a flow diagram 300 shows an example embodiment of a method as carried out at a client in a TP system.

A connection request is sent 301 to a server cluster and a balancing manager of the server cluster establishes a connection 302 with a first server. Queued units of work at the client are sent 303 to the first server.

Failure of the connection is detected 304 by the client and a connection request is sent 305 to the server cluster. This time the connection is established 306 with another server on the server cluster referred to as a second server. Queued units of work at the client are now sent 307 to the second server.

A reconnection request is received 308 at the client from the first server when the first server is back up and running. The first server sends the reconnection request if there are unresolved units of work which were left hanging when the connection failure occurred.

It is determined 309 at the client if a reconnect is acceptable at this time using one or more of: local configurations rules; client knowledge of outstanding units of work at the client; client knowledge of outstanding units of work at the first and/or second server; client knowledge of requests flowing across a connection at a given time. This determination may consider an optimal time for the reconnect to take place.

If it is not determined to be an acceptable time, then a notification may be sent 310 to the first server.

If it is determined to be an acceptable time, then a normal termination may be carried out 311 with the second server with all current requests allowed to complete. If a queue is provided, all requests may be queued at the client.

A reconnection to the first server is carried out 312 with no change in state of the connection. Outstanding units of work at the first server may be resynchronized with the client 313 and new units of work may be sent to the first server from the client 314.

Figure 4:
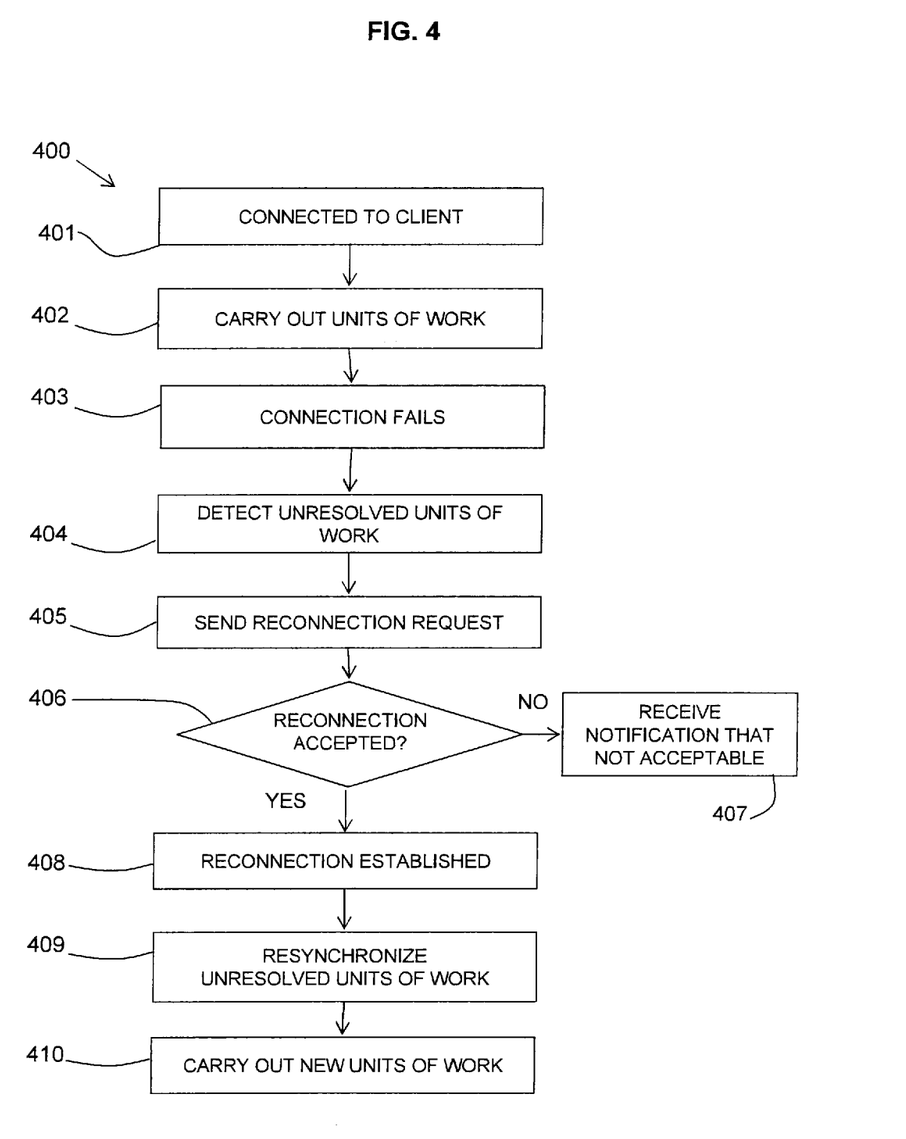
FIG. 4 is a flow diagram of an embodiment of a method at a server in accordance with an aspect of the present invention.

Referring to FIG. 4, a flow diagram 400 shows an example embodiment of a method as carried out at a first server of a server cluster of a TP system.

The first server may be connected 401 to the client and may carry out 402 units of work. The connection may then fail 403. This failure may be due to a failure of the first server or its connection.

The first server may detect unresolved units of work 404 and determine if the connection is a server cluster connection. If so, a reconnection request is sent 405 to the client once the first server is up and running including a server reconnect flag signaling to the client that it wants to be reconnected if the client is already in session with another server because the first server has units of work that need resynchronizing.

It is determined 406 if the reconnection is accepted by the client. If it is not, the first server may receive a notification 407 that the reconnection is not acceptable.

If the reconnection is established 408, the unresolved units of work are resynchronized 409 and new units of work are carried out 410 by the first server.

Figure 5:
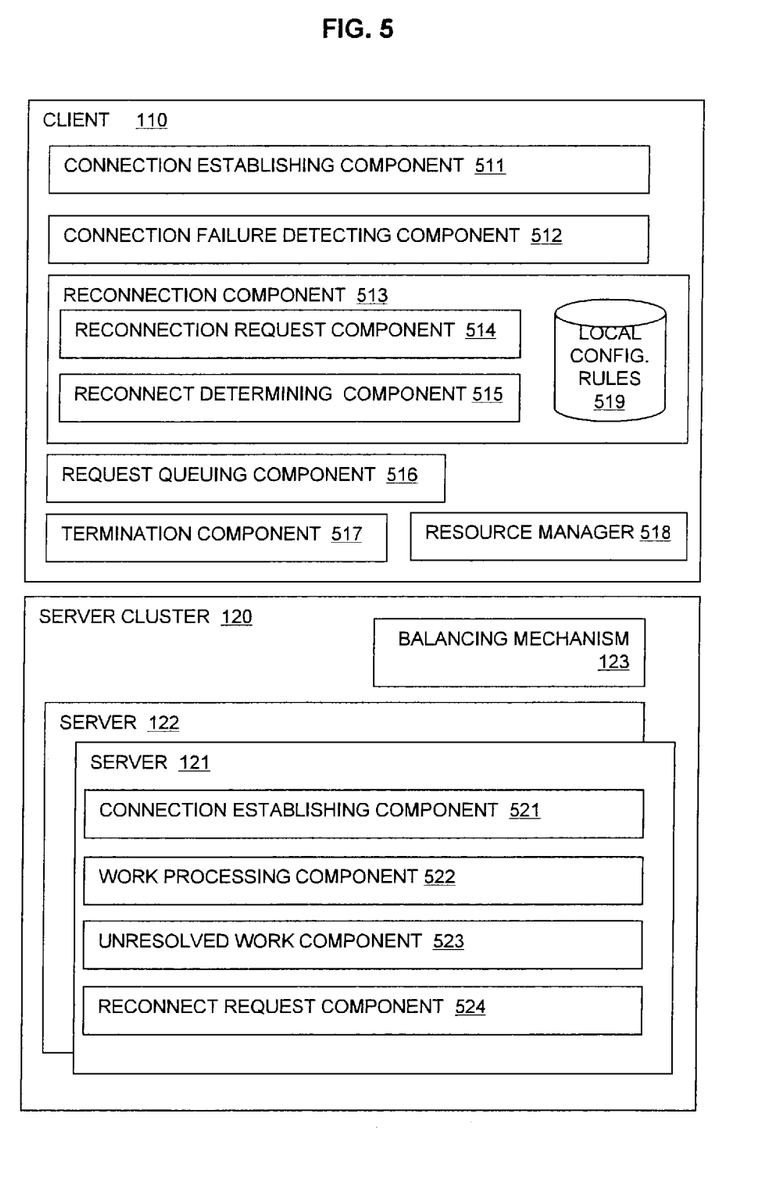
FIG. 5 is block diagram of an example embodiment of a system in accordance with an aspect of the present invention.

Referring to FIG. 5, a block diagram shows an example embodiment of a TP system 500 including a client 110 and a server cluster 120 having multiple servers 121, 122. Multiple clients 110 may be included in the system as well as multiple additional servers; however, this basic arrangement is used to describe examples of the method and system. The server cluster 120 may have cloned servers having a single TP address for access by a client 110.

A client 110 may include a connection establishing component 511 for establishing a connection with a server cluster 120 which has a balancing mechanism 123 for selecting an available server 121, 122 within the cluster 120 to establish a connection at any time. Each server 121, 122 has a corresponding connection establishing component 521 and a work processing component 522 for processing units of work which may be sent from a request queuing component 516 of the client 110. In some embodiments, a request queuing component 516 is not provided and requests are sent without queuing.

The client 110 has a connection failure detecting component 512 for detecting when a connection with a server 121, 122 fails. A server 121, 122 includes an unresolved work component 523 for determining when units of work remain unresolved due to a failure in connection with the client 110. When the connection is available again, a reconnect request component 524 may send a reconnect request.

The client 110 includes a reconnection component 513 including a reconnection request component 514 for receiving a reconnection request from a server 121 and a reconnect determining component 515 for determining if it is an acceptable time to reconnect to the requesting server. The reconnect determining component 515 may use local configuration rules 519 and resource manager 518 to determine if it is an acceptable time.

The client 110 includes a termination component 517 for terminating a current connection to a server, and the connection establishment component 511 may then reconnect to the requesting server.

Figure 6:
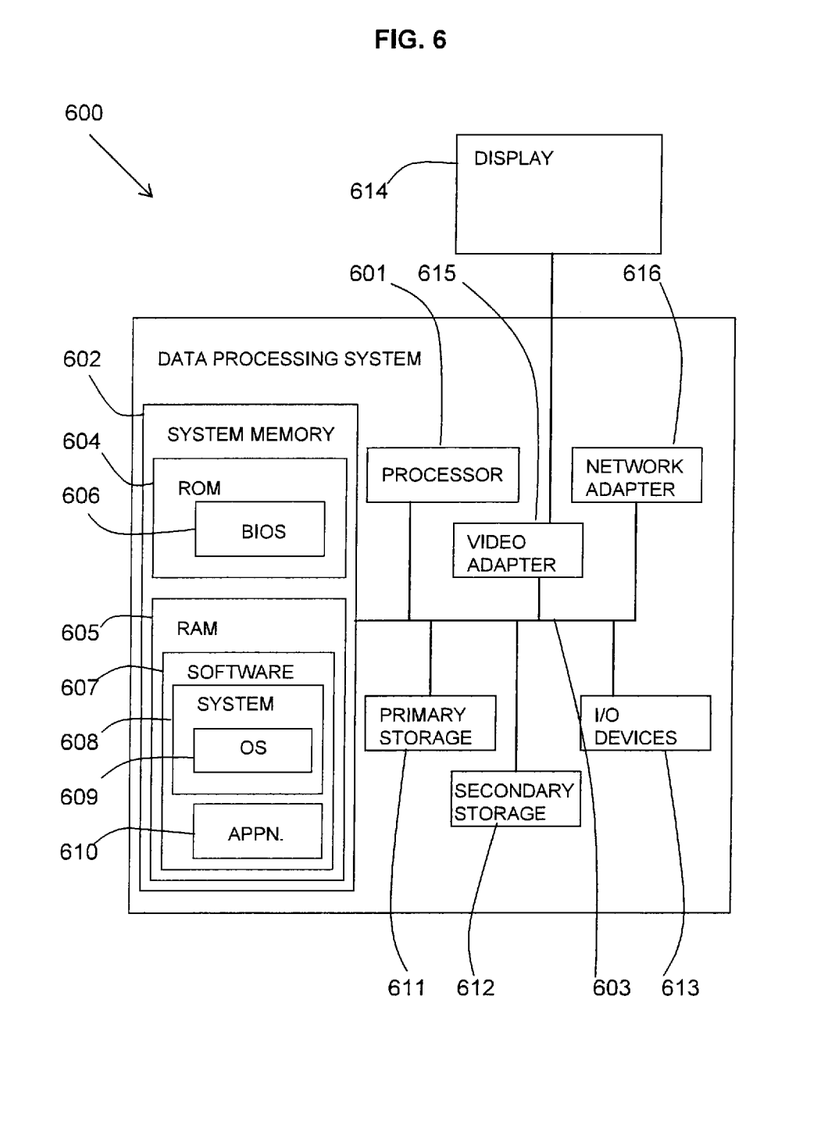
FIG. 6 is a block diagram of an embodiment of a computer system in which aspects of the present invention may be implemented.

Referring to FIG. 6, an example system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code is to be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611, such as a magnetic hard disk drive, and secondary storage means 612, such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612, as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices, such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

As described herein, according to one aspect of the present invention, there is provided a method for reconnection of a client to a server in a transaction processing server cluster having a single address, the method carried out at a client and comprising: establishing a connection with a first server in the server cluster and requesting units of work at the first server; detecting a failure of the connection with the first server; establishing a connection with a second server in the server cluster and requesting units of work at the second server; receiving a reconnection request from the first server, wherein the first server has unresolved units of work; terminating the connection with the second server including completing current units of work; and reconnecting with the first server and resynchronizing the unresolved units of work with the first server.

The method may include, on receiving a reconnection request, determining a suitable time to terminate the connection with the second server and to reconnect with the first server. Determining a suitable time may be based on one or more of the group of: client local configuration rules; client knowledge of outstanding units of work at the client; client knowledge of outstanding units of work at the first and/or second server; client knowledge of requests flowing across a connection at a given time.

Receiving a reconnection request may include receiving a reconnect flag indicating that the reconnection request is for a previously established connection and indicating the server cluster to which the first server belongs.

The first and second servers may be cloned servers and the establishing a connection with a first or second server may be carried out by a balancing manager of the server cluster.

Reconnecting with the first server may use the same server cluster connection state by switching the client to server cluster connection from the second server to the first server.

During terminating the connection with the second server, new units of work may be queued at the client and sent to the first server once reconnected.

Detecting a failure of the connection with the first server may be a result of a failure of the connection or the server.

According to another aspect of the present invention, there is provided a computer program stored on a computer readable medium and loadable into the internal memory of a digital computer, comprising software code portions, when the program is run on a computer, for performing the method of the one aspect of the present invention.

According to yet another aspect of the present invention, there is provided a system for reconnection of a client to a server in a transaction processing server cluster having a single address, the system comprising: a client including: a connection establishing component for establishing a connection with a first server in the server cluster and requesting units of work at the first server; a connection failure detecting component for detecting a failure of the connection with the first server; the connection establishing component for establishing a connection with a second server in the server cluster and requesting units of work at the second server; a reconnection component for receiving a reconnection request from the first server, wherein the first server has unresolved units of work; a termination component for terminating the connection with the second server including completing current units of work; and the connection establishing component for reconnecting with the first server and resynchronizing the unresolved units of work with the first server.

The system may include a reconnect determining component for, on receiving a reconnection request, determining a suitable time to terminate the connection with the second server and to reconnect with the first server. The reconnect determining component may be for determining a suitable time based on one or more of the group of: client local configuration rules; client knowledge of outstanding units of work at the client; client knowledge of outstanding units of work at the first and/or second server; client knowledge of requests flowing across a connection at a given time.

The first and second servers may be cloned servers and the connection establishing component for establishing a connection with a first or second server may include a balancing manager of the server cluster.

According to a further aspect of the present invention, there is provided a method for reconnection of a client to a server in a transaction processing server cluster having a single address, the method carried out at a first server and comprising: having a connection with a client and carrying out units of work for the client; detecting a failure of the connection with the client leaving unresolved units of work at the first server; sending a reconnection request to the client; and reconnecting with the client and resynchronizing the unresolved units of work with the client.

Sending a reconnection request may include sending a reconnect flag indicating that the reconnection request is for a previously established connection and indicating the server cluster to which the first server belongs.

Reconnecting with the client may use a same server cluster connection state by switching a connection from a second server in the server cluster to the first server.

According to another aspect of the present invention, there is provided a computer program stored on a computer readable medium and loadable into the internal memory of a digital computer, comprising software code portions, when the program is run on a computer, for performing the method of the further aspect of the present invention.

According to another aspect of the present invention, there is provided a system for reconnection of a client to a server in a transaction processing server cluster having a single address, the system comprising: a first server including: a connection establishing component for having a connection with a client and a work processing component for carrying out units of work at the first server; an unresolved work component for detecting a failure of the connection to the client leaving unresolved units of work at the first server; a reconnect request component for sending a reconnection request to the client; and the connection establishing component enabling reconnection with the client and resynchronizing the unresolved units of work with the client.

The first server may include: a reconnection flag component for indicating that the reconnection request is for a previously established connection and indicating the server cluster to which the first server belongs.

The connection establishing component may be for reconnecting with the client using a same connection state by switching a connection from a second server in the server cluster to the first server.

The first and second servers may be cloned servers and the connection establishing component for establishing a connection with a first or second server may include a balancing manager of the server cluster.

According to yet another aspect of the present invention, there is provided a method substantially as described with reference to the figures.

According to an even further aspect of the present invention, there is provided a system substantially as described with reference to the figures.

The described aspects of the invention provide the resolving of partially completed transactions when a failure occurs without manual intervention.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A method of reconnecting a client to a server in a transaction processing server cluster, the method executed at a client and comprising:

establishing a connection with a first server in a server cluster and requesting units of work at the first server, the cluster including at least the first server and a second server, the cluster having a single address for accessing both the first server and the second server;

detecting a failure of the connection with the first server;

establishing a connection with a second server in the server cluster and requesting units of work at the second server;

receiving a reconnection request from the first server while connected to the second server, wherein the connection requests indicates that the first server has unresolved units of work;

determining, based on receiving the reconnection request, a suitable time to terminate the connection with the second server and to reconnect with the first server;

terminating the connection with the second server including completing current units of work; and reconnecting with the first server and resynchronizing the unresolved units of work with the first server.

2. The method as claimed in claim 1, wherein determining the suitable time is based on one or more of client local configuration rules, client knowledge of outstanding units of work at the client, client knowledge of outstanding units of work at one or more of the first server or the second server, and client knowledge of requests flowing across a connection at a given time.

3. The method as claimed in claim 1, wherein receiving the reconnection request includes receiving a reconnect flag, the reconnect flag indicating that the reconnection request is for a previously established connection and indicating the server cluster to which the first server belongs.

4. The method as claimed in claim 1, wherein the first server and the second server are cloned servers and the establishing the connection with the first server or the second server are executed by a balancing manager of the server cluster.

5. The method as claimed in claim 1, wherein reconnecting with the first server uses a same server cluster connection state by switching the client to the server cluster connection from the second server to the first server.

6. The method as claimed in claim 1, wherein during terminating the connection with the second server, new units of work are queued at the client and sent to the first server based on being reconnected.

7. The method as claimed in claim 1, wherein the detecting the failure of the connection with the first server is a result of a failure of the connection or the first server.

* * * * *